United States Patent Office 3,776,825
Patented Dec. 4, 1973

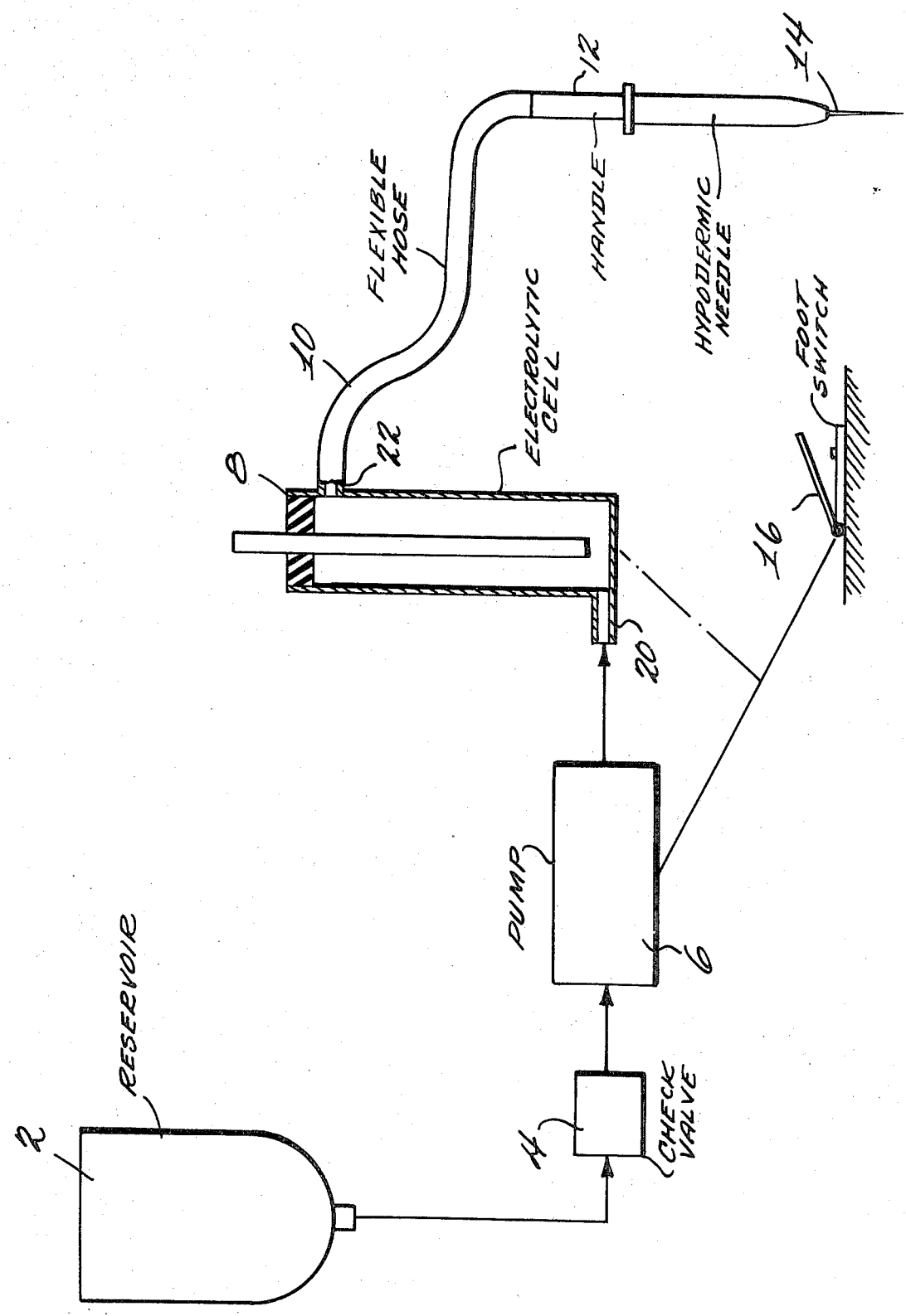

3,776,825
ELECTROLYTIC TREATMENT
Jaroslav Vit, Belle Mead, N.J., assignor to National Patent Development Corporation, New York, N.Y.
Filed Oct. 26, 1972, Ser. No. 301,142
Claims priority, application Great Britain, Aug. 24, 1972, 39,591/72
Int. Cl. B01k *1/00;* A61k *5/02*
U.S. Cl. 204—81    9 Claims

ABSTRACT OF THE DISCLOSURE

An aqueous solution is provided containing (1) an alkali metal or alkaline earth metal halide where the halogen has an atomic weight of 35 to 127 and (2) an amine containing a hydroxy group, a sulfonic acid group, an acetyl group or a carboxylic acid group and the solution is decomposed electrolytically to form the corresponding N-halo compound in situ.

---

The present invention relates to the formation of N-monohaloamines.

N-monohaloamines also containing a hydroxy group, a sulfonic group, an N-acetyl group or a carboxylic acid group are useful for many purposes. Thus they are useful in treating teeth to remove caries and plaque, prevent the formation of calculus and to brighten teeth.

Many of these N-monohaloamines which are most useful for such purposes are relatively unstable and must be prepared in situ.

The normal way for preparing such compounds is to employ alkali metal or alkaline earth metal hypohalites. Such hypohalites also are unstable in aqueous solution. The unstability of the hypohalite and of the N-haloamino compound is an impediment to the free and full use of such solutions. The halogen atoms have an atomic weight of 35 to 127, i.e., they are chlorine, bromine or iodine.

It is accordingly an object of the present invention to provide a method for the formation of the solutions immediately prior to use.

Another object is to provide a method for the formation of the solutions, immediately prior to use, in an apparatus for their application to the teeth.

An additional object is to provide an apparatus for the electrolytic formation of such solutions and their application to the teeth essentially immediately upon formation.

According to the present invention, a solution of an alkali metal or an alkaline earth metal halide is decomposed electrolytically so as to provide free halogen which then reacts to form hypohalite in the presence of hydroxide ion. In order to form an N-halo derivative, the starting solution should also contain a suitable amino compound or compounds. The hypohalite reacts to form an N-halo derivative as soon as it is formed in the solution.

The starting solution may contain one or more alkali metal or alkaline earth metal halide MX and/or $M^2X_2$, where M equals Li, Na, K, Rb, Cs and $M^2$ equals Ca, Sr, Ba and X equals Cl, Br, I. These solutions are electrolyticaly decomposed according to the following equations:

Anode    $M^+ + e + H_2O \rightarrow MOH + \tfrac{1}{2} H_2$

Cathode    $X^- \rightarrow \tfrac{1}{2} X_2 + e$ or

Anode    $M^{++} + 2e + 2H_2O \rightarrow M^2(OH)_2 + H_2$

Cathode    $2X^- \rightarrow X_2 + 2e$

The free halogen obtained immediately forms hypohalite:

$2MOH + X_2 \rightarrow MOX + MX + H_2O$ $M^2(OH)_2 + X_2 \rightarrow M^2X(OX) + H_2O$ $2M^2(OH)_2 + 2X_2 \rightarrow M^2(OX)_2 + M^2X_2 + 2H_2O$ These hypohalites can then react with a suitable amino compound(s) to give the N-halo derivative(s).

Examples of suitable starting halides are sodium chloride, sodium bromide, sodium iodide, lithium chloride, lithium bromide, lithium iodide, potassium chloride, potassium bromide, potassium iodide, rubidium or cesium chloride, calcium chloride, calcium bromide, calcium iodide, strontium chloride, strontium bromide, strontium iodide, barium chloride, barium bromide and barium iodide.

The solution formed should have an alkaline pH usually 8 to 12 an preferably 10.5 to 11.5, most preferably 11 to 11.5. Desirably the electrolysis is carried out to form a solution 0.004 to 0.016 molar in N-haloamine while not essential it is preferable to have present excess unhalogenated amine, i.e., in an amount up to 15 times the halogenated amine and preferably 6 to 8 times the N-halogenated amine on a molar basis.

As the amino nitrogen compounds there can be used either inorganic compounds such as sulfamic acid or organic compounds containing 2 to 11 carbon atoms, e.g., glycine, sarcosine, alpha-aminoisobutyric acid, taurine, 2-aminoethanol, N-acetylglycine, alanine, beta-alanine, serine, phenyl alanine, norvaline, leucine, isoleucine proline, hydroxyproline, omega aminoundecanoic acid, aspartic acid, glutamic acid, glutamine, asparagine, valine, tyrosine, threonine, cysteine, cystine, methionine, glutamine, tryptophane, histidine, arginine, lysine, alpha-aminobutyric acid, gamma-aminobutyric acid, alpha, epsilon diamino pimelic acid, ornithine, hydroxyl lysine, anthranilic acid, p-aminobenzoic acid, sulfanilic acid, orthanilic acid, phenyl sulfamic acid, aminopropanesulfonic acid, 2-aminoethanol, 2-aminopropanol, diethanolamine, ethylenediamine tetraacetic acid (EDTA), nitrilotriacetic acid and aminomethanesulfonic acid.

Examples of N-halo compound include N-chloroglycine, N-bromoglycine, N-iodoglycine, N-chlorosarcosine, N - bromosarcosine, N - iodosarcosine, N - chloro alpha amino isobutyric acid, N - chlorotaurine, N - bromotaurine, N-iodo taurine, N-chloro ethanolamine, N-ethanolamine, N-iodo - N-acetyl glycine, N-bromo, N-acetyl glycine, N-chloroalanine, N-chloro beta alanine, N-bromo beta alanine, N-chloroserine, N-bromoserine, N-iodoserine, N-chloro-N-phenylalanine, N-chloroisoleucine, N-chloronorvaline, N-chloroleucine, N-bromoleucine, N-iodoleucine, N-chloroproline, N-bromoproline, N-iodoproline, N-chloro hydroxyproline, N-chloro omega aminoundecanoic acid, N-chloroaspartic acid, N-bromoaspartic acid, N-chloroglutamic acid, N-iodoglutamic acid, N-chlorovaline, N-chlorotyrosine, N-bromotyrosine, N-iodotyrosine, N-chlorothreonine, N-chlorocysteine, N-chlorocystine, N-chloromethionine, N-bromomethionine, N-chlorotryptophane, N-chlorohistidine, N-chloroargenine, N-chloroglutamine, N-bromoglutamine, N-chlorolysine, N-chloro gamma aminobutyric acid, N-chloro alpha, epsilon diaminopimelic acid, N-chloro ornithine, N-chloro hydroxylysine, N-chloroanthranilic acid, N-chloro p-aminobenzoic acid, N-chlorosulfanic acid, N-chloro phenylsulfamic acid, N-chloro aminopropanesulfonic acid, N-aminomethanesulfonic acid, N-chloropropanolamine, N-chlorodiethanolamine, N-chloro ethylene diamine tetraacetic acid (in this compound the nitrogen atom apparently functions as a quaternary nitrogen).

Hypohalides MOX and/or $M^2X(OX)$ and/or $M^2(OX)_2$ and/or N-halo derivatives specified above, can be generated in the stream of a water solution, e.g. to be delivered as a liquid jet stream.

In a preferred method, the electrolysis step is carried out in a flow system upstream of a reservoir to receive the activated solution, or upstream of a means adapted to direct the stream of activated solution onto an affected area such as the teeth. By way of example, the electrolysis may take place in a cell coupled to a dispenser nozzle, either at the nozzle itself or in a separate location and coupled to the nozzle through piping such as flexible hose.

The stream of liquid may be at constant pressure, but in a preferred method it is used as a pulsating stream so as to act on the affected tooth material not only by abrasion caused by the stream flow, but also by erosion caused by mechanical fatiguing of the affected material by the pulsating jet.

The invention will be understood best in connection with the drawing wherein the single figure is a diagrammolic illustration of one apparatus for carrying out the invention.

Referring more specifically to the drawing there is provided a reservoir 2 containing starting aqueous solution containing, for example, sodium chlorine and glycine (as well as hydroxide, e.g., NaOH to control the pH). The solution then goes via suction check valve 4 to a pump 6, e.g., a pulse generator with drive. The solution then goes to electrolytic cell 8 whenever needed. Flow of the solution is controlled by foot switch 16. The hypohalite, e.g., sodium hypochlorite is formed in situ in the cell 8 and immediately forms the N-halo compound, e.g., N-chloroglycine. The cell has an inlet 20 and an outlet 22. After leaving the outlet 22 the N-haloamine formed goes via flexible hose or tubing 10 to the hypodermic needle (or the nozzle) 14 which can be held by handle 12 and the flow of solution directed to a patient's mouth.

The starting solution advantageously contains (i) MX and MOH or $M^2(OH)_2$ and/or $M^2X_2$ and $M^2(OH)_2$ or MOH and (ii) a suitable water soluble amino compound, capable of forming an N-halo derivative by reacting with the hypohalide. Illustrative hydroxides are sodium hydroxide, potassium hydroxide, calcium hydroxide, barium hydroxide.

The pump may generate, for example, a steady pressure of 10 to 200 p.s.i., preferably 20–40 p.s.i., or a pulsating pressure of from 0 to 10 p.s.i., up to 0 to 200 p.s.i. during each pulse Pulse frequency may conveniently be from 100 to 1500 pulses per minute, and preferably 400–750 pulses a minute.

The electrolytic cell must contain an anode, preferably a graphite anode, and cathode, preferably a stainless steel cathode. The anode is connected to the plus pole and the cathode to the minus pole of an electric current source, for instance, a battery. Potential between the anode and cathode must be above 1.5 volt, and preferably between 2.0 and 5.0 volts.

A thermostat is preferably employed, e.g., a low volume/high surface type, or a direct electric current heater, to allow maintainance of temperature preferably between 35 and 45° C., and especially body temperature 37° C., in the solution beyond the nozzle.

The handle may be connected with the apparatus via a flexible hose or pipe capable of free bending and preferably able to withstand pressures up to 200 p.s.i. at a maximum temperature of, e.g., 45° C. It could carry a nozzle of a gauge of, say, 19 to 30, and preferably 20 to 23. It is useful to have an exchangeable nozzle, such as a hypodermic needle.

EXAMPLE

Preparation of a decayed tooth for filling

Any of the solutions below may be delivered through the above-described apparatus, either as a steady jet or as a pulsating jet stream to remove caries from teeth or to remove plaque from teeth. Steady stream conditions are less efficient than pulsating conditions.

| Solution[1] | | | Amino compound |
|---|---|---|---|
| A | NaCl, 0.10 | NaOH, 0.08 | 0.05 glycine. |
| B | KCl, 0.15 | KOH, 0.08 | 0.05 taurine. |
| C | LiBr, 0.15 | LiOH, 0.08 | 0.05 glycine. |
| D | NaI, 0.10 | NaOH, 0.12 | 0.10 sulfamic acid. |
| E | $CaCl_2$, 0.10 | NaOH, 0.07 | 0.05 glycine. |
| F | NaCl, 0.10 | NaOH, 0.08 | 0.025, glycine; 0.025 taurine. |

[1] Moles in a liter of a water solution.

EXPERIMENTAL RESULTS

Caries removal—steady stream

| Solution | Temp. (° C.) | Needle gauge | Pressure (p.s.i.) | Potential (volts) | Volume (ml.) | Time for complete removal (min.) |
|---|---|---|---|---|---|---|
| A | 37 | 20 | 20 | 2.5 | 250 | 3.0 |
| B | 28 | 21 | 30 | 3.0 | 300 | 4.5 |
| C | 37 | 20 | 20 | 5.0 | 280 | 6.0 |
| D | 35 | 23 | 60 | 4.0 | 350 | 7.0 |
| E | 40 | 19 | 10 | 5.0 | 650 | 6.0 |
| F | 39 | 23 | 100 | 4.5 | 545 | 5.5 |
| C | 45 | 20 | 40 | 6.0 | 440 | 5.0 |
| F | 38 | 20 | 200 | 3.5 | 820 | |

Caries removal—pulsating stream

| Solution | Temp. (° C.) | Needle gauge | Pressure (p.s.i.) | Potential (volts) | Volume (ml.) | Time for complete removal (min.) |
|---|---|---|---|---|---|---|
| A | 37 | 20 | 0–10 | 4.0 | 285 | 3.0 |
| B | 37 | 20 | 0–40 | 3.5 | 230 | 2.0 |
| C | 35 | 20 | 0–40 | 4.5 | 440 | 3.5 |
| D | 40 | 21 | 0–25 | 4.0 | 350 | 4.0 |
| E | 38 | 23 | 0–100 | 5.5 | 380 | 5.0 |
| F | 38 | 20 | 0–80 | 5.0 | 400 | 4.5 |
| A | 39 | 20 | 0–200 | 6.5 | 505 | 3.5 |
| D | 38 | 20 | 0–60 | 4.0 | 715 | 6.0 |

What is claimed is:
1. A method, of producing a solution of N-haloamine:
  (i) providing an aqueous solution containing:
    (a) a halide selected from the group consisting of halides of alkali metals and alkaline earth metals, said halogen having an atomic weight of 35 to 127 and
    (b) an amino compound;
  (ii) decomposing said solution electrolytically to provide free halogen and reacting said free halogen with said amino compound to form said N-haloamine in situ.
2. A method according to claim 1 wherein the halogen is chlorine.
3. A method according to claim 1 wherein said amino compound is selected from the group consisting of sulfamic acid and organic nitrogen compounds having 2 to 11 carbon atoms and selected from the group consisting of amines containing a hydroxyl group, a sulfonic acid group, a carboxylic acid group and an N-acyl group.
4. A method according to claim 3 wherein said halogen is chlorine.
5. A method according to claim 4 wherein said amine is glycine.
6. A method according to claim 4 wherein said amine is selected from the group consisting of sulfamic acid, glycine, 2-aminoethanol, taurine, sarcosine, N-acetyl glycine, N-alpha amino isobutyric acid, ethylene diamine tetraacetic acid and aminomethanesulfonic acid.

7. A method according to claim 3 including the further step of applying the solution of N-haloamine substantially as soon as it is formed to teeth to remove a member of the group consisting of (a) caries and (b) plaque.

8. A method according to claim 7 wherein the amine is glycine.

9. A method according to claim 3 wherein the solution is applied as a jet to teeth.

References Cited

UNITED STATES PATENTS

| 2,616,927 | 11/1952 | Kauck et al. | 204—81 X |
| 3,476,753 | 11/1969 | Hansen | 204—81 X |
| 3,632,489 | 1/1972 | Weinberg et al. | 204—81 X |

JOHN H. MACK, Primary Examiner

D. R. VALENTINE, Assistant Examiner

U.S. Cl. X.R.

32—15